April 11, 1933.  F. L. JOHNSON  1,903,458
COLLAPSIBLE CORE
Filed Jan. 11, 1930  2 Sheets-Sheet 1

INVENTOR
FRANK L. JOHNSON
BY
Ely & Barrow
ATTORNEYS.

April 11, 1933.                F. L. JOHNSON                1,903,458
                               COLLAPSIBLE CORE
                             Filed Jan. 11, 1930              2 Sheets-Sheet 2
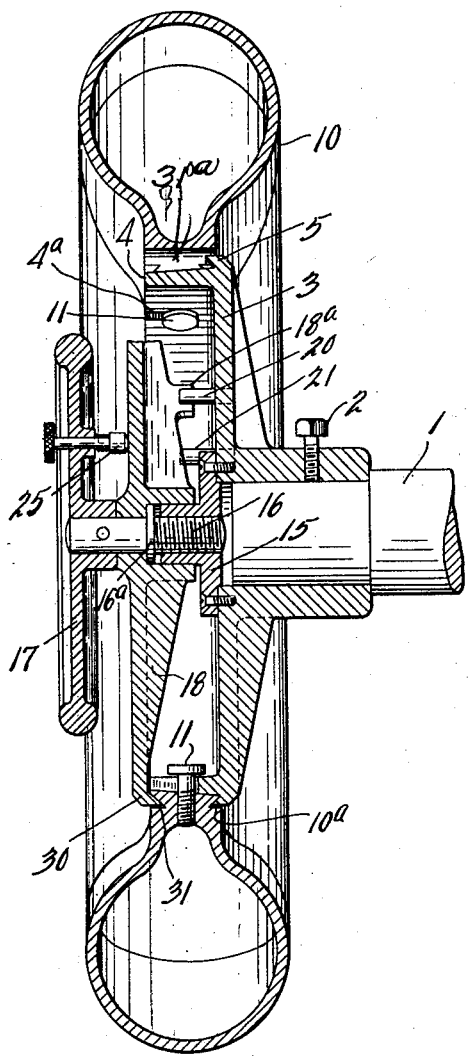
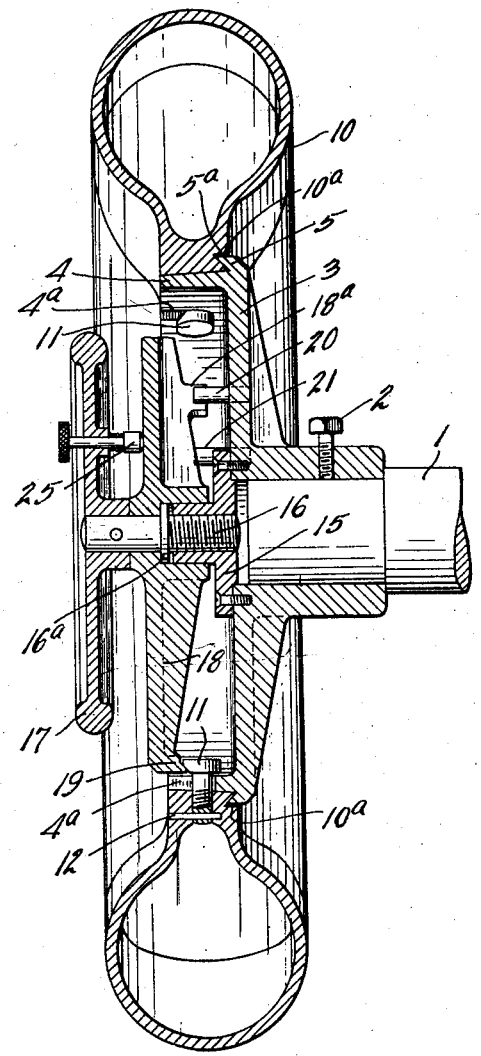
Fig.-3                                Fig.-2
                                                    INVENTOR
                                              FRANK L. JOHNSON.
                                  BY
                                              Ely & Barrow
                                                   ATTORNEYS Patented Apr. 11, 1933

1,903,458

UNITED STATES PATENT OFFICE

FRANK L. JOHNSON, OF AKRON, OHIO

COLLAPSIBLE CORE

Application filed January 11, 1930. Serial No. 420,041.

This invention relates to collapsible cores of the type used to build pneumatic tires, and more particularly to cores of large cross section and small internal or bead diameters such as required for large bus and truck pneumatics.

Owing to the bulk of the core and the small bead diameter, considerable difficulty has been experienced in designing cores which are readily removable from the tire after building and which can be readily reassembled to build another tire.

It is an object of the invention to provide an inexpensive, efficient, collapsible core which may be rapidly assembled and disassembled.

The above and other objects of the invention are attained by the apparatus illustrated in the accompanying drawings and described below, it being understood that the invention is not limited to the specific form thereof shown and described.

In the drawings,

Figure 2 is a sectional view taken on the line 2—2 of Figure 1; and

Figure 3 is a view similar to Figure 2 of a modified form of the invention.

Figure 1:
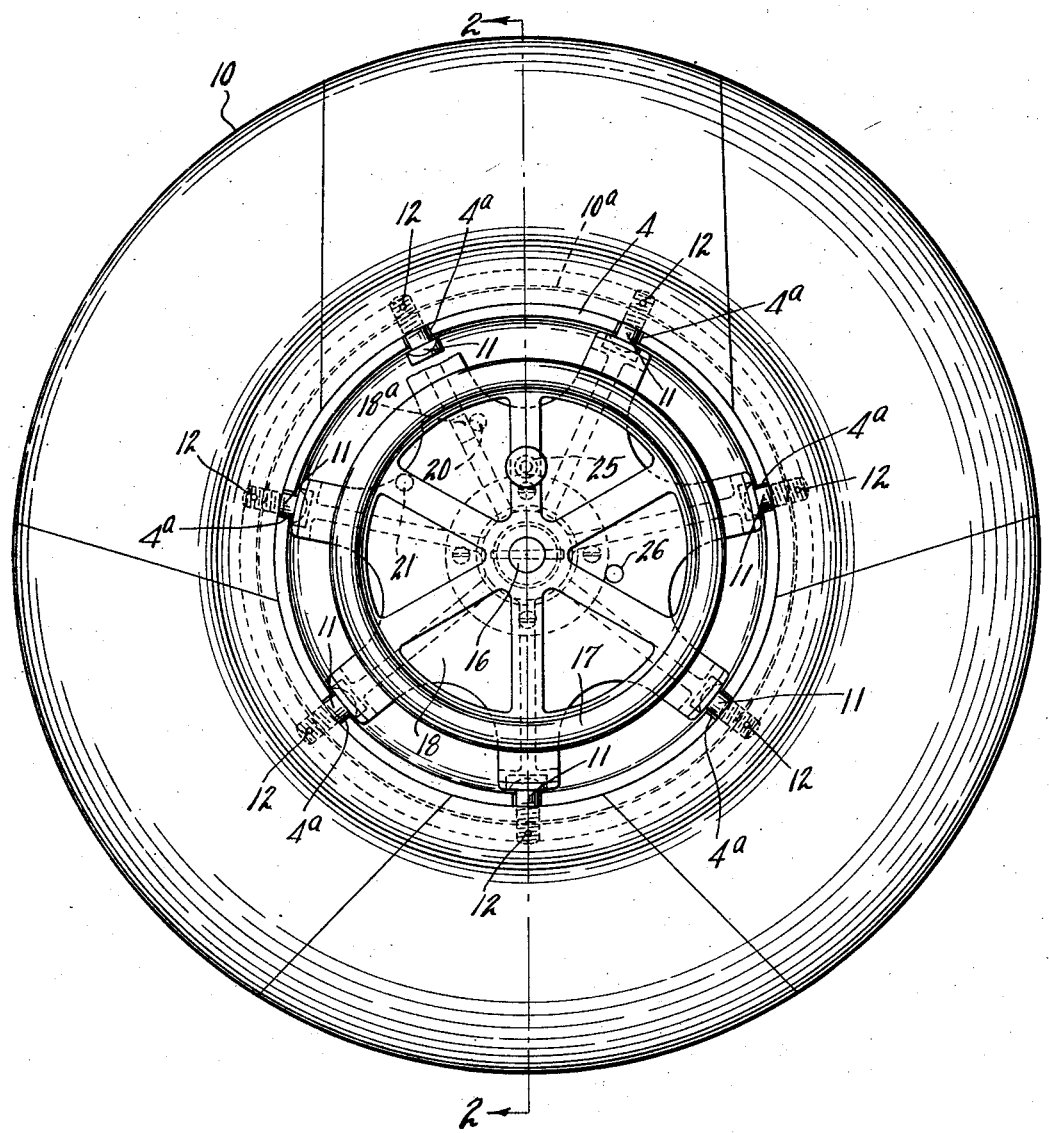
Figure 1 is a side elevation of a collapsible core embodying the invention.

In the drawings the numeral 1 indicates the usual driving shaft of a tire building machine to which is fixed by suitable means, such as a set screw 2, a core carrying wheel member 3. The wheel member 3 is formed with a tapered peripheral outer surface such as a flange 4 and a radial flange 5 which preferably has a side extending V-shaped rib $5^a$ thereon.

The tapered flange 4 is adapted to receive a tire building form or core 10. The core body is cut or divided into a plurality of sections or segments according to the manner in which the core is to be disassembled and according to the size or bulk thereof. A satisfactory design for this purpose is shown in Figure 1. One or more radial cap screws 11 are fixed to the inner periphery of each core section. The cap screws 11 are received in slots $4^a$ in the flange 4. In the initial assembly of the core upon the member 3 the cap screws 11 are adjusted to just clear the inner surface of the flange 4 at which position they are secured by pins 12. To assist in properly aligning the core sections, the core is preferably provided with an annular V-shaped groove $10^a$ adapted to engage with the rib $5^a$ on the member 3.

Fixed to the member 3 is a threaded socket 15 receiving a threaded spindle 16 to which is secured a hand wheel 17. A spider 18 is journaled on the socket 15 and the spindle 16 and through the agency of a flange $16^a$ on the spindle the spider 18 is adapted to be moved to and from the member 3 as the spindle is rotated by the hand wheel. The ends of the spider arms and the side of the cap screws 11 are preferably formed as shown at 19 so that upon engagement the core sections are drawn down tight against the flange. The movement of the spider 18 from engaging to non engaging position is limited by a pair of stop pins 20 and 21 cooperating with an inwardly extending lug $18^a$ on the rear face of the spider. The hand wheel 17 may be provided with a spring pressed detent 25 which is adapted to engage in a recess 26 in the spider 18 upon the rotation of the hand wheel 17 to the unclamping position, at which time the hand wheel and the spider are locked and further movement of the hand wheel moves the spider 18 to the non-engaging position.

In the operation of the device, the core segments are slipped on the flange 4, the slots $4^a$ therein receiving the cap screws 11 and retaining the sections in place. The spider 18 is, of course, at this time in the non-engaging position determined by the pin 21 and the stop $18^a$ and the detent 25 of the hand wheel is in the recess 26 of the spider. The hand wheel 17 is now moved clockwise (Figure 1) which moves the spider 18 to the engaging position, determined by the stop $18^a$ and the pin 20, so that the spider arms engage with the cap screws of the core sections. Before the hand wheel can be moved through a greater arc, the detent 25 must be pulled out of the recess 26, whereupon the wheel is rotated further to tightly clamp the spider against the cap screws of the core sections, thus clamping the core sections in position.

After the tire has been built on the core, the hand wheel 17 is rotated counter-clockwise to unclamp the spider 18 and further movement of the handwheel 17 causes the detent 25 to engage in the recess 26 of the spider 18. Still further movement of the hand wheel causes the spider to be moved to the non-engaging position. The completely built tire, with the core therein, can now readily be removed from the member 3. The key section and the other sections of the core can now be pulled from the inside of the tire and re-erected on the member 3, whereupon the operation can be repeated.

In Figure 3 is illustrated a modification of the invention, the parts corresponding to those in Figure 1 and being indicated by the same reference characters. This modification differs in construction and operation only in that the spider 18 is not adapted to engage with the cap screws 11 on the core sections but is extended as at 30 to engage in an annular groove 31 in the base core sections, which base is formed with spaced notches as indicated at 31ᵃ to clear the arms of spider 18 when the spider is rotated to its non-engaging position.

As many other changes could be made in the construction, particularly in regard to the shape, size and form of the core, it is intended that all matter contained in the above description or shown in the accompanying drawings shall be interpreted as illustrative only and not in a limiting sense. Accordingly, various modifications and applications of the invention can be resorted to without departing from the spirit of the invention or the scope of the appended claims.

It will be observed that an extremely simple, but practical collapsible core has been provided in which the tire with the complete core can be removed from the central supporting plate or register and when so removed the individual core sections can be stripped from the tire. As they are removed they can be replaced upon the plate in which position they will be held temporarily until the spider is brought to locking position and the core sections clamped on the plate. The tightening of the spider drives the core sections firmly against the outer surface or register on the central supporting plate.

What is claimed is:

1. A collapsible tire building form comprising a member adapted to be received on the driving shaft of a tire building machine, said member having an annular peripheral portion, a plurality of mating form sections received on the annular portion of said member, a spider journaled axially of said member, means for moving said spider circumferentially to and from engagement with the form sections, and means for moving said spider axially to clamp said form sections on the annular portion of said member.

2. In combination, a wheel member having an outer annular surface, a plurality of tire building form sections received on said surface, each of said sections being provided with inward radially extending means engaging in open ended ways in said wheel member, a spider journaled axially of said wheel member, means for moving said spider circumferentially to and from engagement with the form sections, and means for moving said spider axially to clamp said form sections on said member.

3. A collapsible tire building form comprising a wheel member having an annular drum shaped flange, said flange having a tapered surface, a plurality of mating separable form sections adapted to be received on said flange, radial inwardly extending cap screws on said form sections engaging with open ended slots in the flange of said wheel member, a spider journaled axially of said wheel member, means for moving said spider circumferentially into and out of engagement with the heads of said cap screws, and means for moving said spider axially to clamp it against the cap screws to clamp the form in position.

4. A collapsible tire building form comprising a wheel member having an annular drum shaped flange, said flange having a tapered surface, a plurality of mating separable form sections adapted to be received on said flange, radial inwardly extending cap screws on said form sections engaging with open ended slots in the flange of said wheel member, a tapped socket fixed axially of said wheel member, a threaded spindle received in said socket, a spider journaled on said spindle and fixed in axial relation therewith, means for moving said spider circumferentially of said wheel member so that the spider arms are in or out of engagement with the heads of said cap screws, and means for rotating said spindle to move said spider against the heads of said cap screws to firmly clamp the form sections in position.

5. A collapsible tire building form comprising a wheel member having an annular drum shaped flange, a plurality of mating separable form sections adapted to be received on said flange, radial inwardly extending means on said form sections engaging with open ended slots in the flange of said wheel member whereby the form sections can be slid endways off the flange but are prevented from moving radially thereof, a tapped socket fixed axially of said wheel member, a threaded spindle received in said socket, a spider journaled on said spindle and fixed in axial relation therewith, means for moving said spider circumferentially of said wheel member so that the spider arms are in or out of engagement with said engaging means, and means for rotating said spindle to move said spider against said engaging means to firmly clamp the form sections in position.

6. A collapsible tire building form comprising a wheel member having an annular drum shaped flange, said flange having a tapered surface, a plurality of mating separable form sections adapted to be received on said flange, radial inwardly extending cap screws on said form sections engaging with open ended slots in the flange of said wheel member whereby the form sections can be slid endways off the flange but are prevented from moving radially thereof, a spider journaled axially of said wheel member, means for moving said spider circumferentially into and out of engagement with the heads of said cap screws, and means for moving said spider axially to clamp it against the cap screws to clamp the form in position, the engaging portions of the spider arms and the sides of the cap screw heads being tapered so that when the spider is forced against the heads the form sections will be drawn tightly in place.

7. A collapsible tire building form comprising a wheel member having an annular drum shaped flange, said flange having a tapered surface, a raised radial flange at the large end of said tapered drum having a side rib extending towards the drum, a plurality of mating separable form sections adapted to be received on said flange, said form sections having a groove adapted to engage with said side rib, radial inwardly extending means on said form sections engaging with open ended slots in the flange of said wheel member, a spider journaled axially of said wheel member, means for moving said spider circumferentially into and out of engagement with said engaging means, and means for moving said spider axially to clamp it against said engaging means to clamp the form in position.

8. A collapsible tire building form comprising a wheel member having an annular drum shaped flange, said flange having a tapered surface, a raised radial flange at the large end of said tapered drum having a side rib extending towards the drum, a plurality of mating separable form sections adapted to be received on said flange, said form sections having a groove adapted to engage with said side rib, radial inwardly extending means on said form sections engaging with open ended slots in the flange of said wheel member, a spider journaled axially of said wheel member, hand means for moving said spider axially to clamp it against the engaging means to clamp the form in position, and means on said hand means for moving said spider circumferentially into and out of engagement with said engaging means.

9. In a collapsible tire building form, a wheel member having an annular drum shaped tapering flange, a plurality of form sections received thereon, means permitting said sections to be slid on said flange endwise thereof, said means holding the sections radially and circumferentially of the flange, bayonet means journaled axially of said wheel member, bayonet portions on said form sections, means adapted to move said bayonet means axially to clamp the form sections in place, and means for moving said bayonet means circumferentially to and from engagement with the bayonet portions on said form sections.

10. In a collapsible tire building form, a central supporting plate having a circumferential register, a plurality of separable core sections receivable upon the plate, a clamp to hold all of the sections on the plate, and means for temporarily holding the several sections individually upon the plate independently of the clamp.

11. In a collapsible tire building form, a wheel member having an annular drum shaped tapering flange, a plurality of form sections received thereon, interengaging means on the end of the drum of said wheel member and on said form sections to position the form sections radially of the wheel, means permitting said sections to be slid on said flange endwise thereof, said means holding the sections radially and circumferentially of the flange, the portion of said means fixed to the form sections comprising bayonet locking portions, bayonet means journaled axially of said wheel member, means adapted to move said bayonet means axially against the bayonet portions to clamp the form sections in place, and means for moving said bayonet means circumferentially to and from engagement with the bayonet portions on said form sections.

12. In a collapsible tire building form, a wheel member having an annular drum shaped tapering flange, a plurality of form sections received thereon, means permitting said sections to be slid on said flange endwise thereof, said means holding the sections radially and circumferentially of the flange, bayonet mean journaled axially of said wheel member, bayonet portions on said form sections, means adapted to move said bayonet means axially to clamp the form sections in place, and detent means on said bayonet moving means for moving said bayonet means circumferentially to and from engagement with the bayonet portions on said form sections.

FRANK L. JOHNSON.